United States Patent
Zehrung (12)

(10) Patent No.: US 8,178,027 B1
(45) Date of Patent: May 15, 2012

(54) METHOD OF INSTALLATION OF A REQUEST-TO-EXIT (REX) SWITCH

(76) Inventor: Raymond E. Zehrung, Carson City, NV (US)

( * ) Notice: Subject to any disclaimer, the term of this patent is extended or adjusted under 35 U.S.C. 154(b) by 0 days.

(21) Appl. No.: 13/237,579

(22) Filed: Sep. 20, 2011

(51) Int. Cl.
*B29C 45/00* (2006.01)
(52) U.S. Cl. .......................... 264/328.1; 29/428; 29/453
(58) Field of Classification Search ............... 264/328.1; 29/428, 453; 292/340
See application file for complete search history.

(56) References Cited

U.S. PATENT DOCUMENTS 5,065,136 A * 11/1991 Frolov et al. ............... 340/545.2
6,318,138 B1 * 11/2001 Mathews et al. ............. 70/278.7
6,784,784 B1 * 8/2004 Zehrung ........................ 340/5.3
* cited by examiner

*Primary Examiner* — Jill Heitbrink
(74) *Attorney, Agent, or Firm* — Law Offices of Thomas E. Schatzel, A Professional Corporation

(57) ABSTRACT

A request-to-exit (REX) switch comprises an injection-molded plastic body that can snap into the access hole of a mortise lock mechanism to provide a request-to-exit contact generation. A micro-switch mounts to a distal end of the injection-molded plastic body. Such is precisely oriented, positioned, and secured by pressing onto two posts molded into the distal end. The installation is accomplished without tools, and two snap locking tabs in the injection-molded plastic body automatically secure to the access hole of the mortise lock mechanism. An orienting lip on a front cap of the injection-molded plastic body allows only one possible fit. A strain relief for wiring to the micro-switch is a part of the injection-molded plastic body.

2 Claims, 2 Drawing Sheets

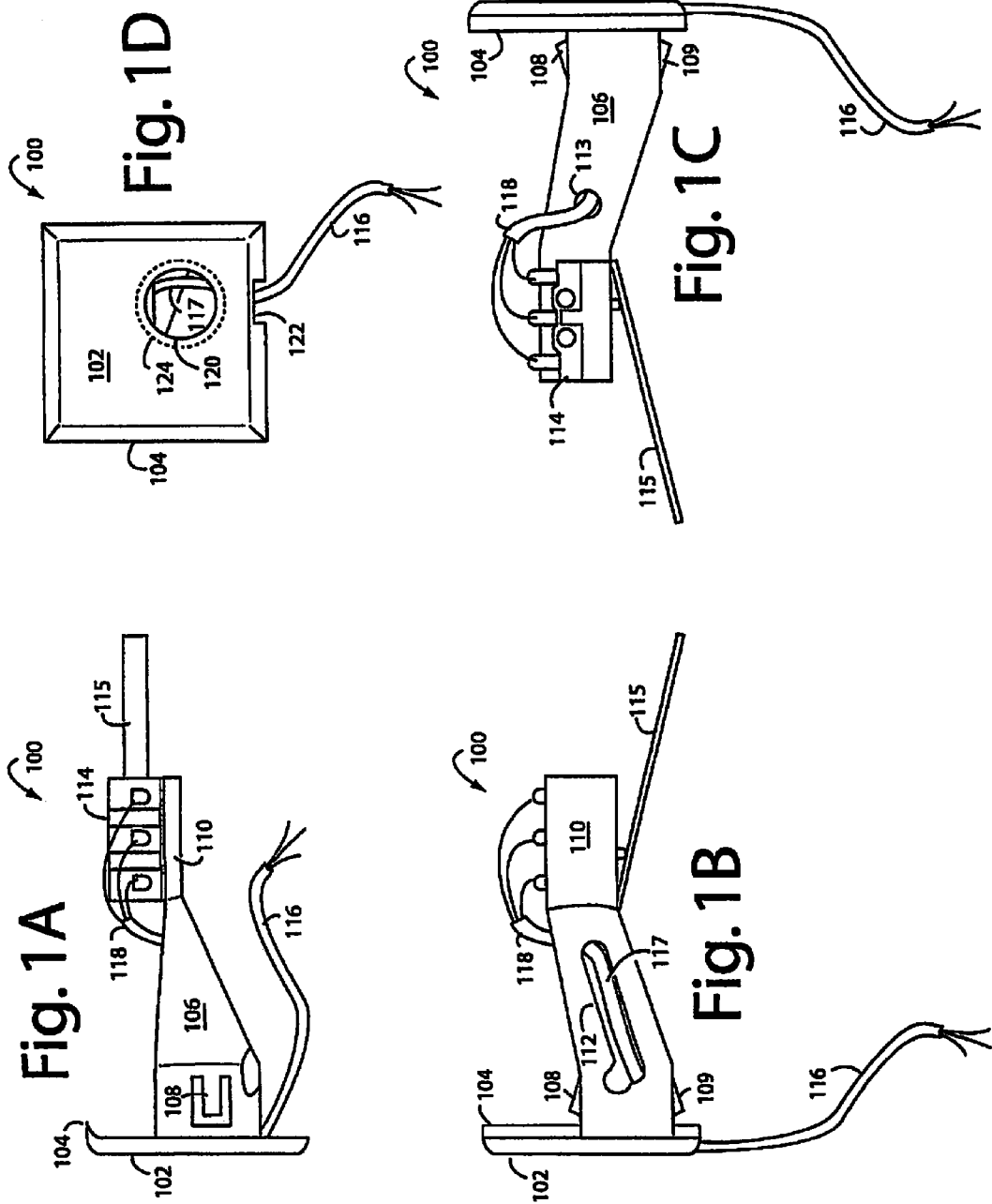

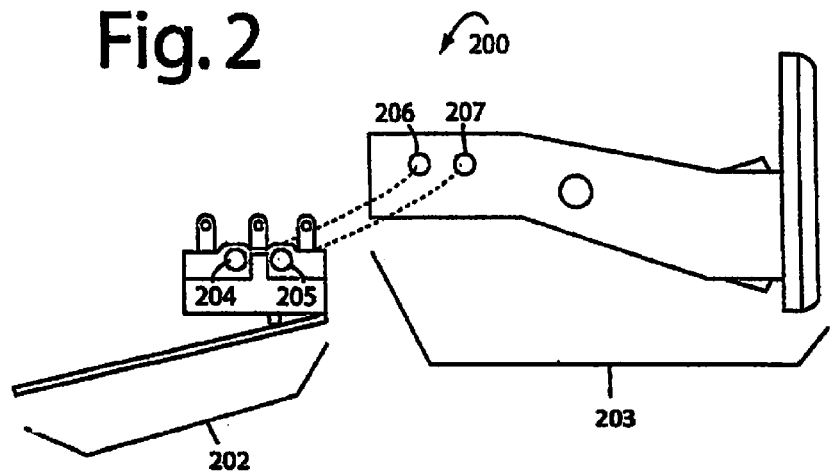
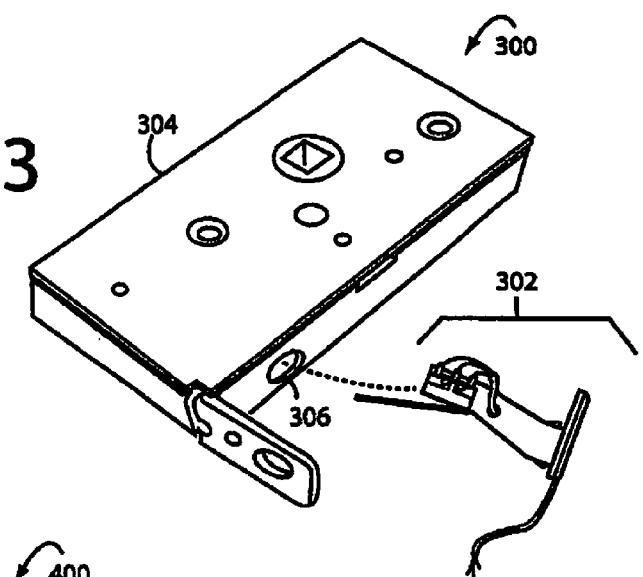
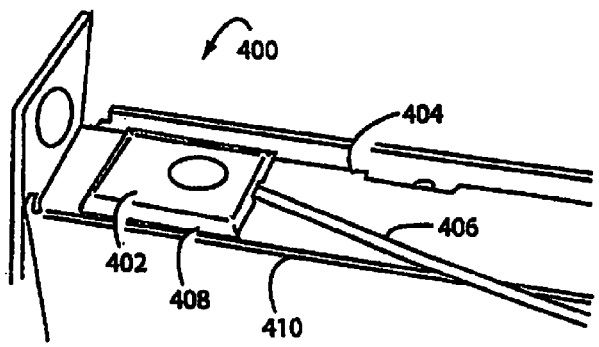

METHOD OF INSTALLATION OF A REQUEST-TO-EXIT (REX) SWITCH

BACKGROUND OF THE INVENTION

1. Field of the Invention

The present invention relates to door lock hardware, and in particular to snap-in request-to-exit switches that can be installed in electrified lock sets and other door latch mechanisms in the field.

2. Description of the Prior Art

Some security doors are normally kept locked and a card access or keypad system is required to gain entry. An electromechanical device in the door is energized at the presentation of a valid card, key fob, or entry code, and the door lock is temporarily released. During this time, the electromechanical device can be heard to buzz or click and most people know that such security doors can then be pushed or pulled open.

Sometimes the alarm system will have to be signaled to call attention to the fact a user wants to go through a locked security door from the inside out, or in an egress situation. So, request-to-exit switches have been installed in special models by the lock manufacturers. These can sense when a user turns a door knob wanting to egress, thereby shunting, or stopping an alarm from sounding, since there is no perceived threat to the system integrity for an authorized, or requested exit.

Special orders are required for these models of door locks, and the costs are significant. Installers must either order a supply of specially equipped locks, or return the originals for retrofitting, or install difficult and complex field switches which require lock disassembly and/or modification. Either way can be expensive and time consuming.

So what is needed is an easy-to-install switch that can be added in later to only those electrified locks that actually require a request-to-exit function. The switch should be simple and easy to install correctly, and it should function properly without needing adjustments. An economic construction should be used so that keeping inventories of a variety of switches for a variety of matching electrified locks is practical and affordable by the average installer.

SUMMARY OF THE INVENTION

Briefly, a switch embodiment of the present invention comprises an injection-molded plastic body that can snap into the access hole of a mortise lock mechanism to provide a request-to-exit contact generation. A micro-switch mounts to a distal end of the injection-molded plastic body. Such is precisely oriented, positioned, and secured by pressing onto two posts molded into the distal end. The installation is accomplished without tools, and two snap locking tabs in the injection-molded plastic body automatically secure to the access hole of the mortise lock mechanism. An orienting lip on a front cap of the injection-molded plastic body allows only one possible fit. A strain relief for wiring to the micro-switch is a part of the injection-molded plastic body.

An advantage of the present invention is that a switch is provided that would be suitable for a wide variety of mechanical and electrical locks, including mortise, cylindrical, and others.

Another advantage of the present invention is that a snap-in switch unit can be adapted for cylindrical locks, panic bars and other types of electro-mechanical hardware, where fasteners, and therefore tools are not needed for installation.

These and other objects and advantages of the present invention will no doubt become obvious to those of ordinary skill in the art after having read the following detailed description of the preferred embodiments that are illustrated in the various drawing figures.

IN THE DRAWINGS

FIGS. 1A-1D are top, right side, left side, and front view diagrams of a request-to-exit switch embodiment of the present invention;

FIG. 2 is an assembly diagram of the request-to-exit switch of FIGS. 1A-1D showing how the micro-switch presses onto two posts molded into the left side of the distal end of a support body;

FIG. 3 is a perspective view diagram that represents one way the request-to-exit switch of FIGS. 1A-1D and 2 may be installed into the access hole of a typical mortise lock assembly; and FIG. 4 is a perspective view diagram illustrating how flush the request-to-exit switch of FIGS. 1A-1D, 2, and 3 may be once installed, and how an orientation lip engages a near edge to insure a proper configuration.

DETAILED DESCRIPTION OF THE PREFERRED EMBODIMENT

FIGS. 1A-1D represents a request-to-exit (REX) switch embodiment of the present invention, herein referred to by the general reference numeral 100. Switch 100 includes a single plastic injection molded piece that includes a front cap 102, an indexing lip 104, a body 106, a pair of snap self-locking tabs 108 and 109, a micro-switch support tab 110, a strain-relief slot 112, and a wire hole 113. A micro-switch 114 with an actuation lever 115 is mounted to the left side of support tab 110, and is electrically connected with a pigtail wire 116. A portion 117 of the pigtail wire 116 is captured in slot 112 for a strain-relief, and an end 118 is soldered to micro-switch 114. The REX switch 100 can be wired as single pole, double throw (SPDT).

In operation, the REX switch 100 is inserted and snapped into a lock assembly, and actuation lever 115 may be pushed by a cam when the door handles are tried by a user. A switch contact or opening is generated that can be wired to an attendant panel.

In order to make injection molding possible and the die tools economical, a molding-tool-release hole 120 is disposed in body 106 near the center of front cap 102. A notch 122 provides for wiring to exit from micro-switch 114 after flush installation.

A round hole is typically provided in lock assemblies that can accept and accommodate the installation of REX switch 100. Body 106 generally has an oval or round trunk section, and just behind front cap 102, body 106 tapers to a round cross-section 124 with an outside diameter slightly larger than hole 120.

FIG. 2 represents how a REX switch 200 can be assembled quickly, precisely, and economically. A fully assembled micro-switch 202 is pressed onto an injection-molded body 203. Two round holes 204 and 205 are sized to jam onto two slightly oval posts 206 and 207. No glue or setup jigs are required to get a permanent connection that is precisely aligned. Once the parts are pressed together, they lock permanently.

FIG. 3 represents a mortise lock assembly 300 in which a REX switch 302 like those of FIGS. 1A-1D and 2 is simply pressed into an access hole 306 in a mortise lock 304. REX switch 302 is specifically configured to match the peculiar mechanical configuration of a particular manufacturer's mortise lock 304 and the access hole 306 that they have provided. Other models and makes of locks can necessitate differently configured REX switches 302.

FIG. 4 represents a REX switch installation 400 in which a REX switch of FIGS. 1A-1D, 2, and 3, may be installed in a mortise lock 404, e.g., a Schlage brand Series L Mortise lock. A pigtail wire 406 is dressed along the lock body, and wired ultimately to a control panel. An index lip 408, similar to 104 in FIG. 1, curves over and matches the curvature of a round edge 410 on the mortise lock 404. This indexes the REX switch properly in the round hole (e.g., 306, FIG. 3) that the REX switch snaps into.

In one example, REX switch embodiments of the present invention provide for quick and easy installation into Schlage L-Series mortise locks. A SPDT micro-miniature lever action switch, rated for 500K cycles can be used with an electrical rating of 1-amp, 250-volts AC/DC. Color coded leads, e.g., red-black-white, may be formed into a pigtail using shrink tubing and strain reliefs. The installation of the REX switch has no impact on any UL-Listing for the latch or the lock. The injection-molded plastic body can be made from UL 94 V-O plastic, or equivalent. The installed REX switch on the lock body is very low profile, as in FIG. 4, and avoids interfering with the insertion of the lock body into a mortise cutout.

Embodiments of the present invention allow users to stock electrified lock bodies and to apply REX switches as needed.

A method of constructing REX switch 100, 200, 302, for use in electrified locks is simplified by injection-molding a single plastic body 203. Such includes a pair of posts 206 and 207 onto which a micro-switch 114, 202 can be pressed on to have the precise orientation, position, and rigidity necessary for the micro-switch to sense a mechanical operation inside a matching electrified lock 304, 404. The single plastic body 203 also includes a rounded trunk section 124 with self-locking tabs 108 and 109 to fit within a round access hole 306 in electrified lock 304 and 404. A front cap 102, 402 with a lip 104, 408 along one edge is molded in to key the whole unit with a single orientation in the round access hole 306. A molding-tool-release hole 120 is included in the injection-molded plastic body 106, 203 near the center of the front cap 102, 402, wherein, an economical injection molding is made possible.

If the expense can be justified for a metal casting mold, it would essentially produce the same profile, design and performance as parts made with plastic injection molding. The plastic alternative described here is less expensive for the mold. Whenever metal is used as a part that an electrical component is attached to, there can be issues with insulation and shorting.

The switch housings can be made of materials other than injected plastic. There are conventional methods of metal casting and tool and die stamping a bracket that would make a part to hold the switch in place. Plastic injection was described and used here, even though the tooling is about eight times more expensive, because it was the best course of action. However, a stamped piece, e.g., from spring steel could be fashioned that would have tabs that the switch locked onto, along with tabs to lock the switch body into the lock body hole.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

The invention claimed is:

1. A method to simplify the installation of a REX switch in electrified locks, comprising:
    injection-molding a single plastic body that includes a pair of posts onto which a micro-switch can be pressed on to have the precise orientation, position, and rigidity necessary for said micro-switch to sense a mechanical operation inside said electrified lock, and that includes a rounded trunk section with self-locking tabs to fit within a round access hole in said electrified lock, and that has a front cap with a hole along one edge to key the whole unit with a single orientation in said round access hole.

2. The method of claim 1, further comprising:
    disposing a molding-tool-release hole in said injection-molded plastic body near the center of said front cap, wherein, an economical injection molding is made possible.

* * * * *